United States Patent
Takahashi et al.

(10) Patent No.: US 9,602,758 B2
(45) Date of Patent: Mar. 21, 2017

(54) COMMUNICATION APPARATUS, CONFERENCE SYSTEM, COMPUTER-READABLE RECORDING MEDIUM, AND DISPLAY CONTROL METHOD

(71) Applicants: Masato Takahashi, Tokyo (JP); Hiroaki Uchiyama, Kanagawa (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP)

(72) Inventors: Masato Takahashi, Tokyo (JP); Hiroaki Uchiyama, Kanagawa (JP); Koji Kuwata, Kanagawa (JP); Kiyoto Igarashi, Kanagawa (JP); Tomoyuki Goto, Kanagawa (JP); Kazuki Kitazawa, Kanagawa (JP); Nobumasa Gingawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/198,791

(22) Filed: Jun. 30, 2016

(65) Prior Publication Data
US 2017/0013225 A1    Jan. 12, 2017

(30) Foreign Application Priority Data

Jul. 10, 2015  (JP) .................................. 2015-138610
Apr. 14, 2016  (JP) .................................. 2016-080949

(51) Int. Cl.
*H04N 7/14* (2006.01)
*H04N 5/445* (2011.01)
(Continued)

(52) U.S. Cl.
CPC ........... *H04N 5/44504* (2013.01); *H04N 5/45* (2013.01); *H04N 7/147* (2013.01); *H04N 7/15* (2013.01)

(58) Field of Classification Search
CPC ........................................................ H04N 7/14
(Continued)

(56) References Cited

U.S. PATENT DOCUMENTS 7,215,345 B1 * 5/2007 Hanko ............... H04N 5/44591
345/620
2007/0291108 A1 * 12/2007 Huber ...................... H04N 7/15
348/14.02
(Continued)

FOREIGN PATENT DOCUMENTS

| JP | 2005-094713 | 4/2005 |
|---|---|---|
| JP | 2012-169723 | 9/2012 |
| JP | 5589644 | 8/2014 |

*Primary Examiner* — Olisa Anwah
(74) *Attorney, Agent, or Firm* — Oblon, McClelland, Maier & Neustadt, L.L.P.

(57) ABSTRACT

A communication apparatus includes: a receiver configured to receive an image through a network so that the communication apparatus displays at least a part of the received image received from the receiver on a display unit; a reception unit configured to receive the number of images to be displayed as clipped images on the display unit and a type of display order in which the clipped images are displayed; an area clipping unit configured to provide the clipped image including a speaker from the received image; and a control unit configured to give the display unit an instruction to display as many clipped images provided from the area clipping unit as the number of images to be displayed in the type of display order received by the reception unit.

9 Claims, 7 Drawing Sheets

(51) Int. Cl.
*H04N 7/15* (2006.01)
*H04N 5/45* (2011.01)

(58) Field of Classification Search
USPC .................. 348/14.01, 14.07, 14.08, 14.1
See application file for complete search history.

(56) References Cited

U.S. PATENT DOCUMENTS

| | | |
|---|---|---|
| 2010/0002069 A1* | 1/2010 | Eleftheriadis .......... H04N 7/152 |
| | | 348/14.08 |
| 2012/0200658 A1* | 8/2012 | Duckworth ............ H04N 7/152 |
| | | 348/14.07 |
| 2013/0293672 A1 | 11/2013 | Suzuki et al. |
| 2015/0046581 A1 | 2/2015 | Inoue |
| 2015/0047002 A1 | 2/2015 | Tamura |
| 2015/0071130 A1 | 3/2015 | Okuyama |
| 2015/0091939 A1 | 4/2015 | Suzuki et al. |
| 2015/0111566 A1 | 4/2015 | Nakamura |
| 2015/0133106 A1 | 5/2015 | Nakamura |
| 2015/0149909 A1 | 5/2015 | Nakamura et al. |
| 2015/0149990 A1 | 5/2015 | Nakamura |

* cited by examiner

FIG.5
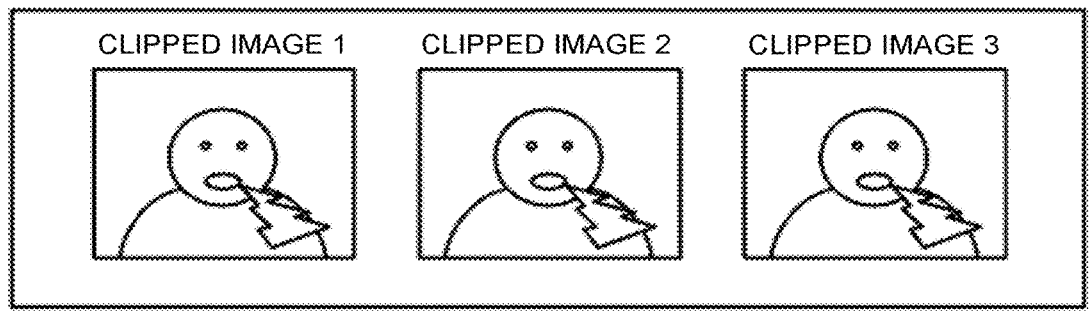
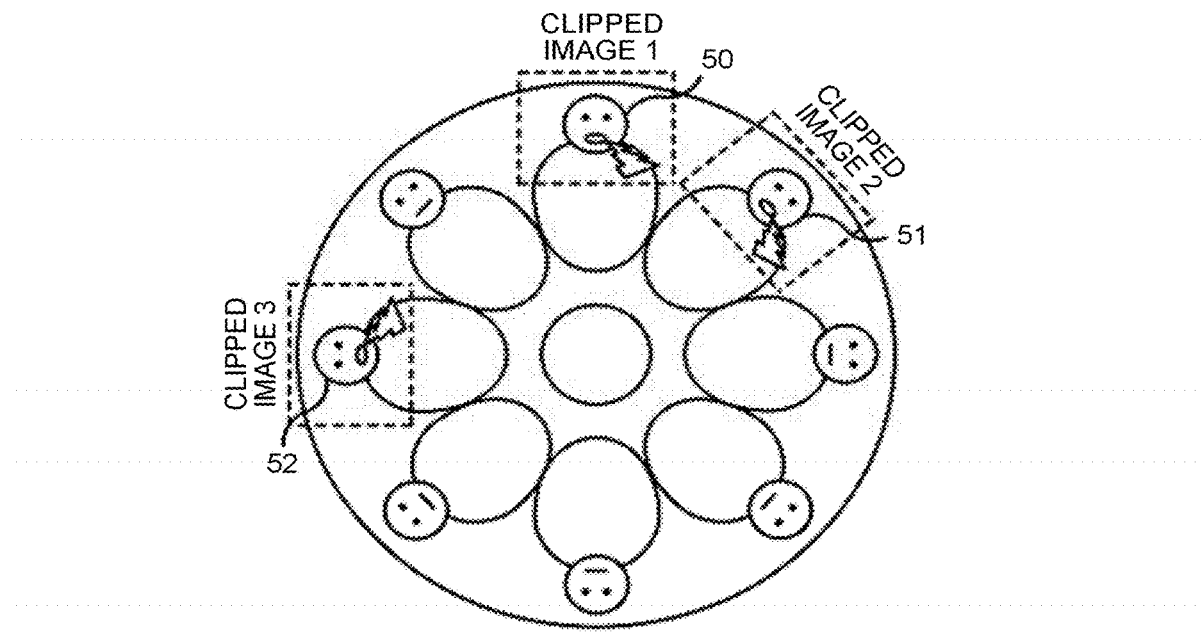

FIG.6
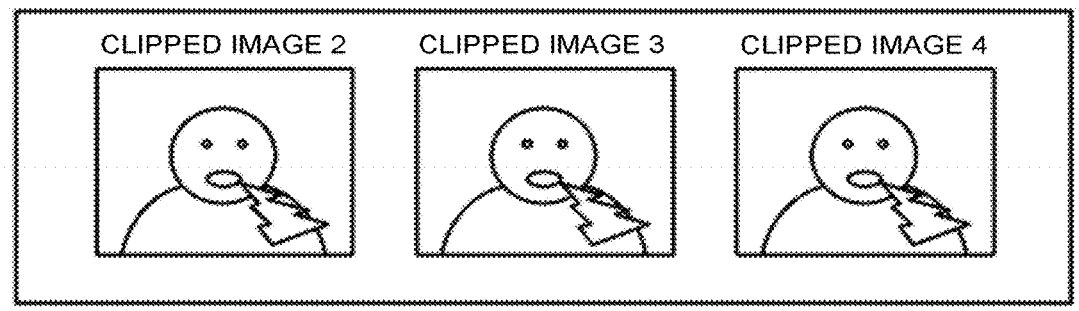
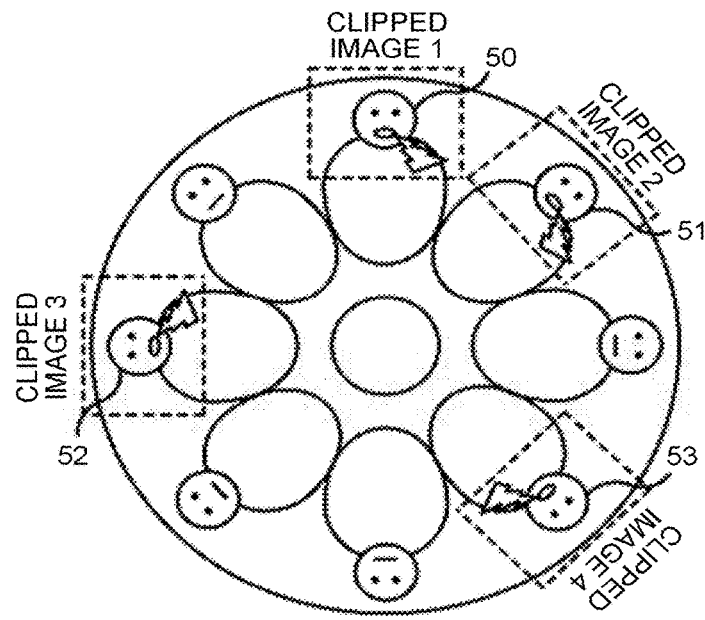

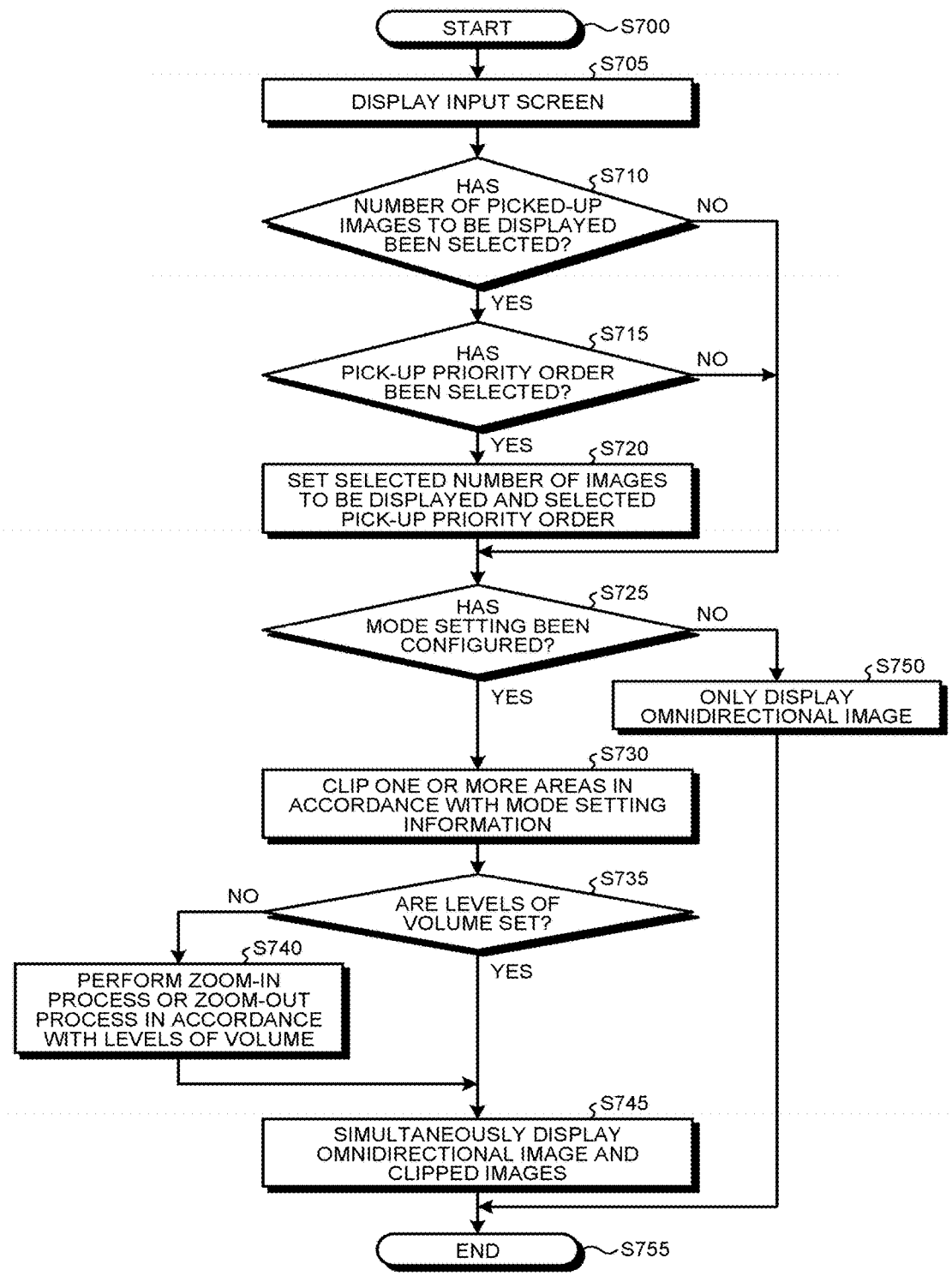

COMMUNICATION APPARATUS, CONFERENCE SYSTEM, COMPUTER-READABLE RECORDING MEDIUM, AND DISPLAY CONTROL METHOD

CROSS-REFERENCE TO RELATED APPLICATIONS

The present application claims priority under 35 U.S.C. §119 to Japanese Patent Application No. 2015-138610, filed Jul. 10, 2015 and Japanese Patent Application No. 2016-080949, filed Apr. 14, 2016. The contents of which are incorporated herein by reference in their entirety.

BACKGROUND OF THE INVENTION

1. Field of the Invention

The present invention relates to a communication apparatus that receives an image through a network and controls the display of the image, a conference system that uses a plurality of communication apparatuses for a conference, a computer-readable recording medium containing a computer program that causes a computer to perform a process for controlling the display of the image, and a display control method for controlling the display of the image.

2. Description of the Related Art

Videoconference systems for a remote conference with a remote place through a network such as the Internet are widely used. The videoconference system uses a communication apparatus placed in a conference room to take an image of the conference room including the user who is a participant in the conference, collect the voice, and transmit the image and voice to the communication apparatus on the other side of the conference, and causes the communication apparatus on the other side to display the image and output the voice. This enables the users to have a conference between remote places while feeling as if the users actually participate in in the conference held in a conference room.

To easily grasp the positional relationship in all the directions among the objects of which images are taken and improve the convenience of operation in such a video conference system, a technique to simultaneously display a circular image, a panoramic image, and a clipped image is proposed (see Japanese Patent No. 5589644). In the technique described in Japanese Patent No. 5589644, an area to be clipped as the clipped image is selected, and the display mode in which the circular image, the panoramic image, and the clipped image are displayed is switched in conjunction with the selecting operation.

It is, however, necessary for the user of the technique to perform touch operation by touching a touch panel to select an area to be clipped, and flick operation to scroll the area to be clipped in order to display an appropriate image. The user needs to perform such operation while speaking in the conference. This extremely lacks the convenience for the user.

In light of the foregoing, there is a need to provide, for example, an apparatus that enables the user to display an optimal image to the user without the user's operation for processing the image including all the participants in the other conference room.

SUMMARY OF THE INVENTION

According to exemplary embodiments of the present invention, there is provided a communication apparatus comprising: a receiver configured to receive an image through a network so that the communication apparatus displays at least a part of the received image received from the receiver on a display unit; a reception unit configured to receive the number of images to be displayed as clipped images on the display unit and a type of display order in which the clipped images are displayed; an area clipping unit configured to provide the clipped image including a speaker from the received image; and a control unit configured to give the display unit an instruction to display as many clipped images provided from the area clipping unit as the number of images to be displayed in the type of display order received by the reception unit.

Exemplary embodiments of the present invention also provide a conference system comprising: a plurality of the above described communication apparatuses, each of the communication apparatuses including an image pickup unit and a transmitter that transmits an image taken by the image pickup unit through a network.

Exemplary embodiments of the present invention also provide a non-transitory computer-readable recording medium that contains a computer program for causing a computer to execute a process for controlling display of a received image received through a network, the process comprising: receiving the number of images to be displayed as clipped images on a display unit and a type of display order in which the clipped images are displayed; providing the clipped image including a speaker from the received image; and giving the display unit an instruction to display as many provided clipped images as the number of images to be displayed in the received type of display order.

Exemplary embodiments of the present invention also provide a display control method for controlling display of a received image received through a network, the method comprising: receiving the number of images to be displayed as clipped images on a display unit and a type of display order in which the clipped images are displayed; providing the clipped image including a speaker from the received image; and giving the display unit an instruction to display as many provided clipped images as the number of images to be displayed in the received type of display order.

BRIEF DESCRIPTION OF THE DRAWINGS

FIG. 5 is a diagram of an exemplary display screen displayed when the display order is set at the order of speeches;

FIG. 6 is a diagram of an exemplary display screen displayed when the users more than or equal to the number of images to be displayed speak while the display order is set at the order of speeches; and FIG. 7 is a flowchart of an exemplary flow of a process that the communication apparatus performs.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
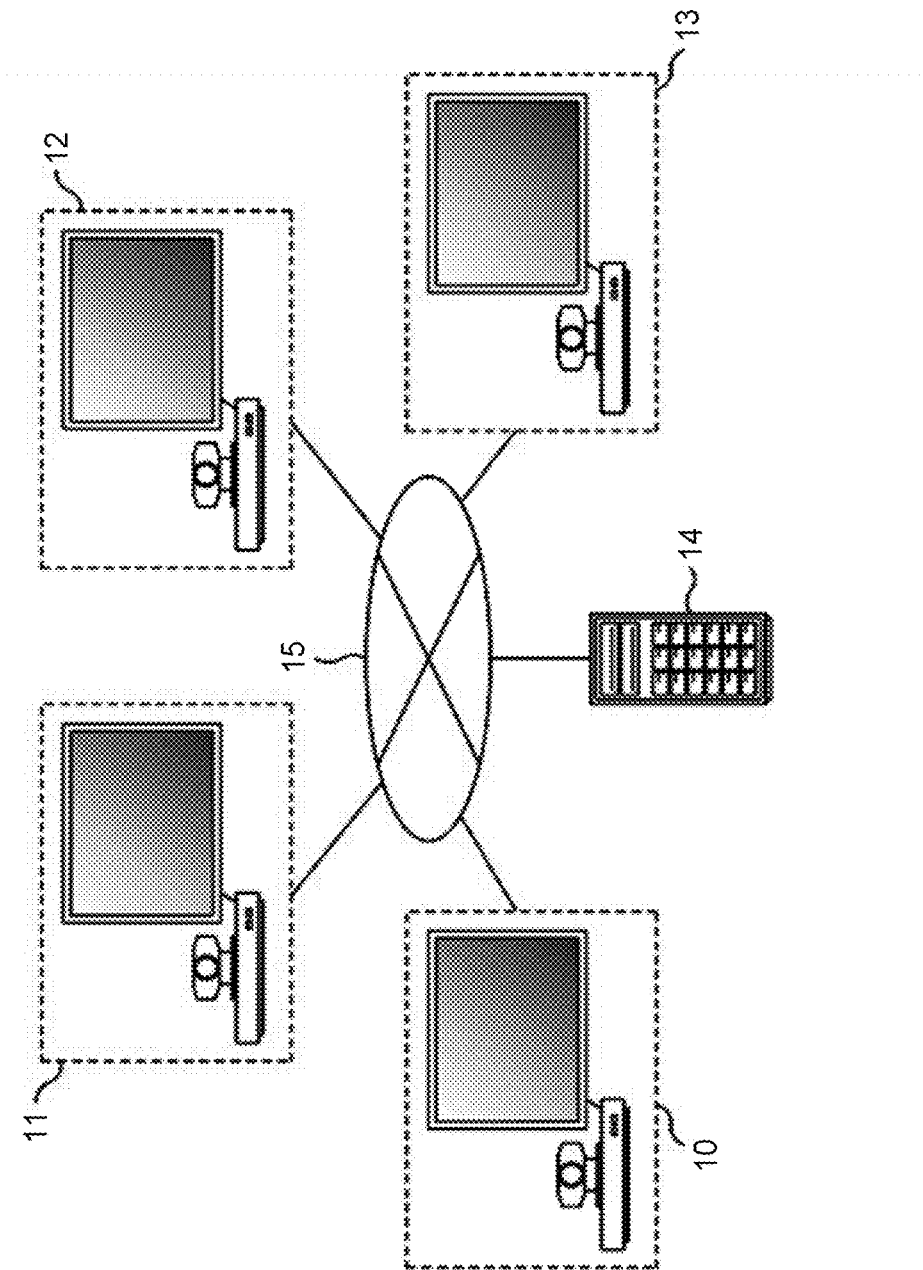
FIG. 1 is a diagram of an exemplary configuration of a conference system according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

FIG. 1 is a diagram of an exemplary configuration of a conference system according to the present embodiment. The conference system includes communication apparatuses 10 to 13 installed on conference rooms separate from each other, respectively, and a server device 14 working as a transfer device that transfers an image and a voice. The communication apparatuses 10 to 13 are connected to a network 15 such as the Internet so as to perform communications via the server device 14. FIG. 1 illustrates the four communication apparatuses 10 to 13. However, the number of communication apparatuses is not limited to four, and can be two, three, or five or more. The network 15 can be either a wired network or a wireless network, or can include two or more networks.

The server device 14 monitors whether each of the communication apparatuses 10 to 13 is connected to the server device 14. The server device 14 controls the calling to the communication apparatus when a conference starts, and controls the transfer of an image and a voice during the conference. The image data and the voice data are actually transmitted, received, and transferred among the apparatuses. However, it is assumed herein that images and voices are transmitted, received, and transferred.

Each of the communication apparatuses 10 to 13 includes an image pickup unit, a voice input unit, a voice output unit, a display unit, a transmitter, and a receiver. This enables each of the communication apparatuses 10 to 13 to take an image of the users who are the participants in the conference and the objects to be taken, obtain the voices of the users, and transmit the obtained image and voices to the server device 14. This also enables each of the communication apparatuses 10 to 13 to receive the image and voices transmitted from the other communication apparatus via the server device 14, and display the image and output the voices.

The conference system exchanges images and voices only among, for example, the communication apparatuses that log in to the conference system to have a conference. For example, when the communication apparatuses 10 to 12 log in to the conference system, images and voices are transmitted and received only among the communication apparatuses 10 to 12. In other words, when the communication apparatus 10 transmits an image and a voice, the image and voice are transmitted only to the communication apparatuses 11 and 12 that participate in in the conference via the server device 14. Thus, the image and voice are not transmitted to the communication apparatus 13 that does not participate in in the conference. Similarly, the image and voice from the communication apparatus 11 are transmitted to the communication apparatuses 10 and 12 via the server device 14 and are not transmitted to the communication apparatus 13.

A plurality of users participate in in the conference in each of the conference rooms on which the communication apparatuses 10 to 12 are installed, respectively, and each of the communication apparatuses 10 to 12 takes a video of all the users in each of the conference rooms, and transmits the taken video as an image to the other communication apparatuses. Meanwhile, each of the communication apparatuses 10 to 12 transmits the voices of the users in each of the conference rooms to the other communication apparatuses. Each of the communication apparatuses 10 to 12 receives the image and voices from the other communication apparatuses and displays the image and outputs the voices.

When transmitting an image and a voice, the communication apparatus 10 can transmits the apparatus identification information for identifying the communication apparatus 10 in addition to the image and voice. The server device 14 can extract the added apparatus identification information and transfer the image and voice to the communication apparatuses other than the communication apparatus identified by the extracted apparatus identification information. The apparatus identification information can be information that can uniquely identify each apparatus, and thus can be, for example, the device name, IP address, or Media Access Control (MAC) address of each communication apparatus. The image can be not only a video but also an image of still images. Note that when the images are still images, the images can be taken and transmitted at given intervals of time. The image of all the users can be taken with a wide-angle lens from the front of the users, or can be taken with a fish-eye lens in all the directions, or can be a panoramic image taken while the central axis is fixed and horizontally rotated right and left.

Figure 2:
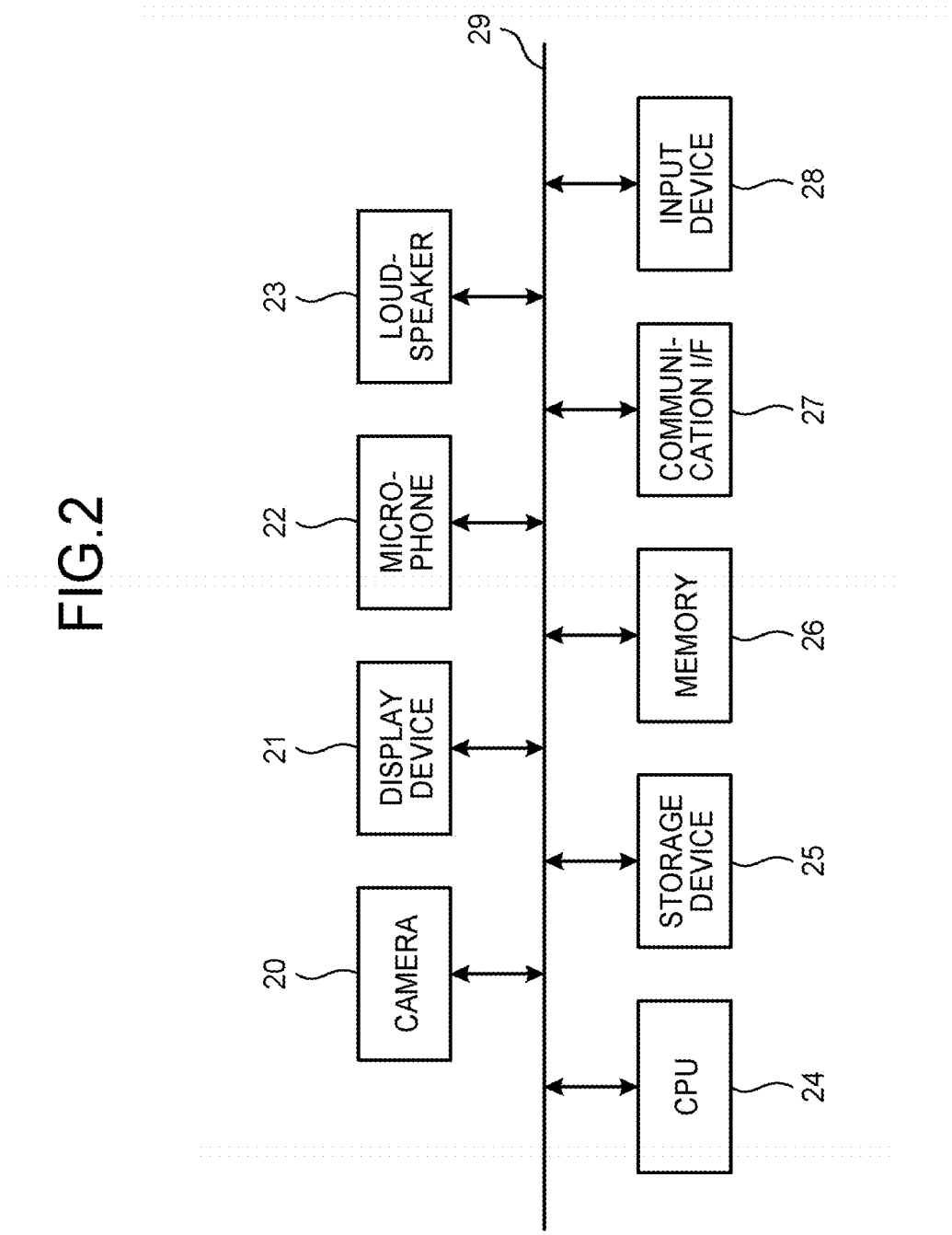
FIG. 2 is a diagram of an exemplary hardware configuration of a communication apparatus included in the conference system.

With reference to FIG. 2, the hardware configuration of the communication apparatus 10 will be described. The communication apparatuses 11 to 13 have the similar configuration to the configuration of the communication apparatus 10. Thus, only the communication apparatus 10 will be described herein. The communication apparatus 10 includes, as the hardware, a camera 20 working as an image pickup unit, a display device 21 working as a display unit, a microphone 22 working as a voice input unit, and a loudspeaker 23 working as a voice output unit. The communication apparatus 10 further includes a CPU 24, a storage device 25, a memory 26, a communication I/F 27, and an input device 28 such as a keyboard or input buttons working as an input unit. The included units are connected to a bus 29 so as to exchange, for example, data via the bus 29.

The camera 20 obtains an image of the users participating in the conference, and transmits the image to the CPU 24. The display device 21 displays the image received from the CPU 24 on a screen. As an example of the display device 21, a Cathode Ray Tube (CRT), a liquid crystal display, or an organic EL display can be cited. The microphone 22 obtains the voices of the users participating in the conference, and transmits the voices to the CPU 24. The loudspeaker 23 outputs the voices received from the CPU 24.

The CPU 24 controls the whole communication apparatus 10, transmits and receives an image and a voice, and gives instructions for the display of the image and the output of the voice. The storage device 25 stores the programs for implementing the control that the CPU 24 performs. As an example of the storage device 25, a non-volatile memory or an HDD can be cited. The memory 26 temporarily stores the data for development or calculation of the programs that the CPU 24 uses. The communication I/F 27 is connected to the other communication apparatuses via the network 15 so as to transmit and receive the image data and voice data. As an example of the communication I/F 27, a wired LAN compatible with the 10Base-T, 100Base-TX, and 1000Base-T and connected to the Ethernet (registered trademark), or a wireless LAN compatible with 802.11a/b/g/n can be cited. The input device 28 receives the information input by the participant in the conference, and transmits the information to the CPU 24. The input device 28 can be not only the keyboard or input buttons but also, for example, a touch panel.

The communication apparatus 10 can include the camera 20, the display device 21, the microphone 22, and the loudspeaker 23 therein. Alternatively, some or all of the camera 20, the display device 21, the microphone 22, and the loudspeaker 23 can be placed outside the communication apparatus 10 and connected to the communication apparatus 10, for example, via a cable. Alternatively, the camera 20, the display device 21, the microphone 22, and the loudspeaker 23 can be wirelessly connected to the communication apparatus 10, for example, via infrared communication, Bluetooth (registered trademark), or a wireless LAN instead of via a wire such as a cable.

The following is the operation when the communication apparatus 10 transmits an image and a voice. The camera 20 and microphone 22 obtain the image and voices of the users participating in the conference, and transmits the image and voices to the CPU 24. The CPU 24 reads a program from the storage device 25 and executes the program so as to correct the image in a predetermined correction, and transmits the corrected image and voices via the communication I/F 27 to the server device 14 connected to the network 15. The server device 14 transfers the image and voices to the other communication apparatuses.

The following is the operation when the communication apparatus 10 receives an image and a voice. The communication I/F 27 receives the image and voice transferred from the server device 14 via the network 15. The CPU 24 reads a program from the storage device 25 and executes the program so as to obtain the image and voice that the communication I/F 27 receives, and transmits the image to the display device 21 and the voice to the loudspeaker 23. The display device 21 receives the image from the CPU 24 and displays the image on the screen. The loudspeaker 23 receives the voice from the CPU 24 and outputs the voice.

Figure 3:
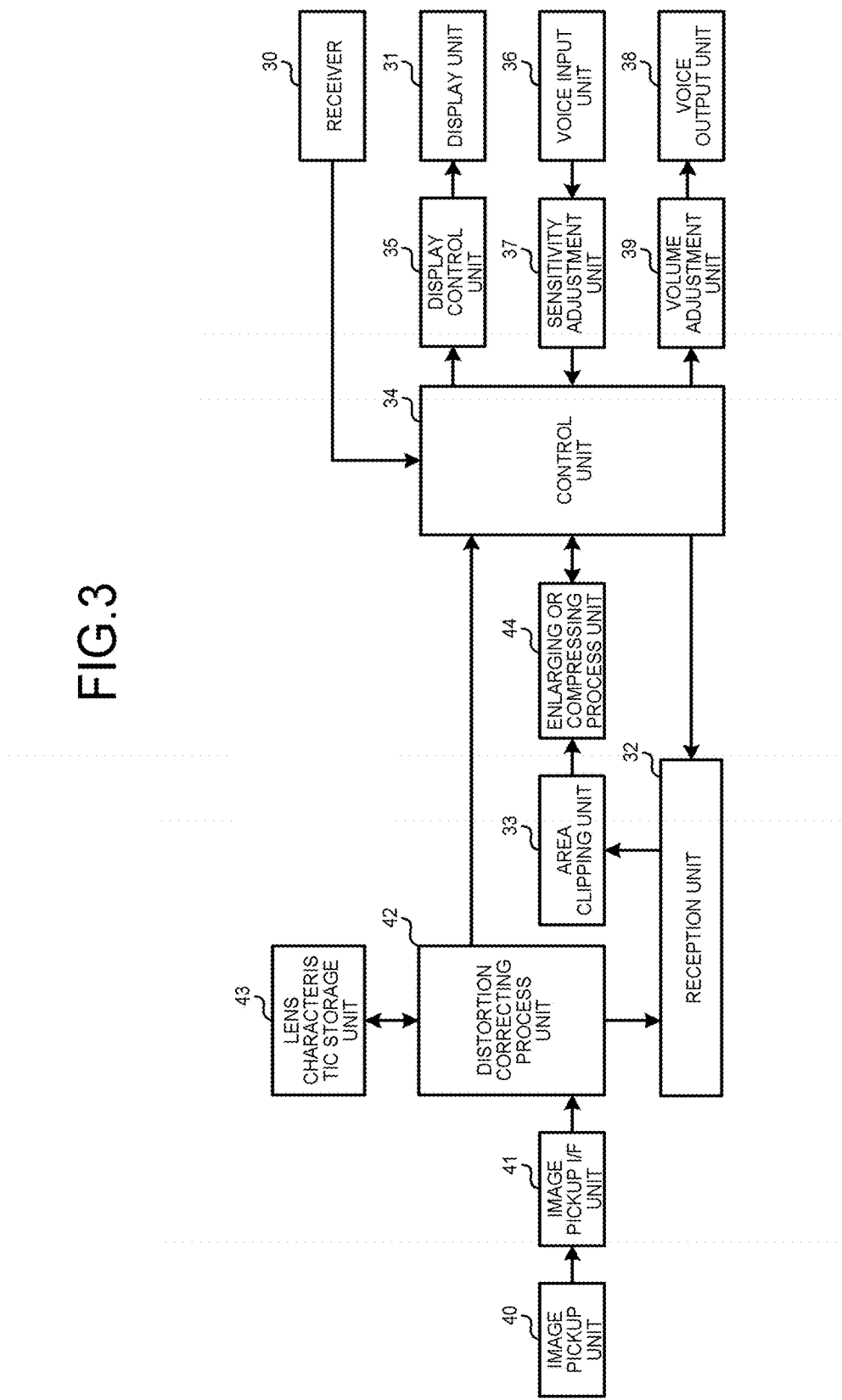
FIG. 3 is a functional block diagram of an exemplary functional configuration of the communication apparatus.

Next, with reference to FIG. 3, the functions that the communication apparatus 10 includes will be described in detail. The communication apparatuses 11 to 13 include the similar functions to the functions of the communication apparatus 10. Thus, only the communication apparatus 10 will be described herein. The communication apparatus 10 includes the following function units to implement the functions. The function units are implemented by the programs stored in the storage device 25 and read and executed by the CPU 24, or are implemented by, for example, the camera 20, the display device 21, the microphone 22, the loudspeaker 23, and the storage device 25.

The communication apparatus 10 includes a receiver 30, a display unit 31, a reception unit 32, an area clipping unit 33, and a control unit 34. In FIG. 3, the communication apparatus 10 includes the display unit 31. However, the display unit 31 can be another device connected to the communication apparatus 10 via a cable or wirelessly. The receiver 30 receives an image taken in the other conference room via the network 15. The display unit 31 is, for example, a CRT or a liquid crystal display, and displays the image data received by the receiver 30 on the screen.

The reception unit 32 clips one or more areas from the image received by the receiver 30. The reception unit 32 receives the number of images to be displayed as clipped images on the display unit 31 and the display order of the clipped images. The reception unit 32 gives the area clipping unit 33 an instruction to obtain as many clipped images as the received number. At that time, the reception unit 32 receives the image together with, for example, the number of images to be displayed via the control unit 34. Then, the reception unit 32 gives the image together with the instruction to the area clipping unit 33.

The area clipping unit 33 receives the instruction from the reception unit 32, clips areas as many as the instructed number of clipped images to be displayed from the image, and obtains the areas as the clipped images in accordance with previously designated conditions. The area clipping unit 33 gives the obtained clipped images to the control unit 34. The control unit 34 arranges the clipped images obtained from the area clipping unit 33 in the display order received by the reception unit 32, and gives the display unit 31 an instruction to display the clipped images together with the image received by the receiver 30. The control unit 34 can perform various I/F controls or calculations including the instructions to the display unit 31.

The reception unit 32 gives the control unit 34 an instruction to display an input screen used to input the number of images to be displayed and the display order so that the control unit 34 can display the input screen on the display unit 31 and obtain the information about the input number of images to be displayed and the input display order. The input screen will be described in detail below. The designated conditions define the position, size, and shape of the area to be clipped. For example, the position is a position at which the upper body including the whole face of a user can be included. The size is horizontal and vertical lengths at which the upper body of the user can be included. The shape is rectangle. The area clipping unit 33 determines the clipped areas as the clipped images, and gives the clipped images to the control unit 34.

The communication apparatus 10 needs to include only the function units. Additionally, the communication apparatus 10 can include a display control unit 35, a voice input unit 36, a sensitivity adjustment unit 37, a voice output unit 38, and a volume adjustment unit 39. The communication apparatus 10 can further includes an image pickup unit 40, an image pickup I/F unit 41, a distortion correcting process unit 42, a lens characteristic storage unit 43, and an enlarging/compressing process unit 44. The display control unit 35 controls the display on the display unit 31, and the display on the input screen. Thus, the control unit 34 can give the instructions described above to the display unit 31 via the display control unit 35.

The voice input unit 36 is, for example, a microphone that receives the input of voice. The voice input unit 36 collects the sound generated in the conference room on which the communication apparatus 10 is installed, and outputs the collected sound as voice to the control unit 34. The voice input unit 36 is preferably a microphone array including a plurality of microphones. This is because arranging the microphones in various directions can detect the direction in which the user who speaks is from the volume of the voice input to each microphone. The sensitivity adjustment unit 37 receives the set values of the sensitivity of the microphones used as the voice input unit 36, and adjusts the sensitivity of the microphones to the set values.

The voice output unit 38 is, for example, a loudspeaker that outputs voice. The voice output unit 38 outputs the voice transmitted from the other communication apparatus. The volume adjustment unit 39 receives the set value of the volume output from the loudspeaker, and adjusts the volume to the set value.

The image pickup unit 40 can be a camera that can take an image only in a direction. However, the image pickup unit 40 is preferably an omnidirectional camera that can take 360 degrees. This is because the camera can take an image of all the users participating in the conference at once. The image pickup unit 40 takes an image of all the users and obtains the image data by Photo-electronically converting the image. Then, the image pickup unit 40 adjusts the obtained image data in various types of image adjustment, and outputs the adjusted image data to the image pickup I/F unit 41. The image pickup I/F unit 41 transfers the image data to the distortion correcting process unit 42 using a high-speed serial I/F such as V-by-One (registered trademark) or HDMI (registered trademark).

The distortion correcting process unit 42 corrects the distorted 360-degree image to obtain an image without distortion by a distortion correcting process. The distortion correcting process can be, for example, a method in which an image of an object for correction such as a test chart is taken and a distortion coefficient is found from the taken image, and an image is corrected using the distortion coefficient. The method is an example, and any known method can be used.

The distortion includes geometric distortion called distortion aberration. The distortion aberration is determined depending on the lens characteristics including the focal length of the lens or the size of the diaphragm. Thus, the distortion correcting process unit 42 can perform a distortion correcting process suitable for the lens characteristics with reference to the lens characteristics. The lens characteristics can previously be stored in the lens characteristic storage unit 43.

The distortion correcting process unit 42 gives the image corrected by the distortion correcting process to the control unit 34. The control unit 34 gives a transmitter (not illustrated) an instruction to transmit the corrected image together with the voice provided from the voice input unit 36 to the other communication apparatus.

The control unit 34 can determine whether the volume of the voice received by the receiver 30 is large or small. When the volume is large, it is assumed that the distance between the speaker of the received voice and the voice input unit included in the other communication apparatus is short. When the volume is small, it is assumed that the distance between the speaker of the received voice and the voice input unit included in the other communication apparatus is long. The control unit 34 notifies the enlarging/compressing process unit 44 of the assumed information. The enlarging/compressing process unit 44 performs a process for enlarging (zooming in) or compressing (zooming out) the image of the user in the clipped image clipped and output by the area clipping unit 33. The enlarging/compressing process unit 44 can perform the zoom-in process or the zoom-out process using software called zoom driver.

The control unit 34 obtains the image received by the receiver 30, the clipped images received from the enlarging/compressing process unit 44, and the mode setting information including the number of images to be displayed and the display order received by the reception unit 32. The control unit 34 gives the display control unit 35 an instruction to display the clipped images on the display unit 31 in accordance with the number of images to be displayed and display order included in the mode setting information, and to display the image corrected by the distortion correcting process at the same time. The display control unit 35 displays the clipped images and the image corrected by the distortion correcting process on the display unit 31 in accordance with the instruction.

Figure 4:
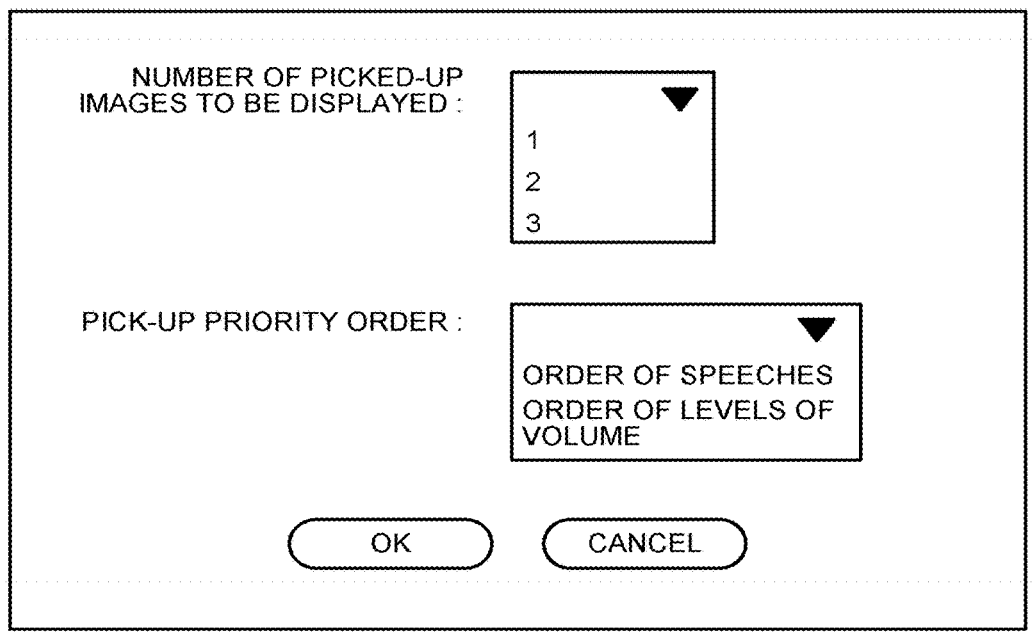
FIG. 4 is a diagram of an exemplary input screen used to input the number of images to be displayed and display order.

Next, the input screen displayed on the display unit 31 in accordance with the instruction from the reception unit 32 will be described with reference to FIG. 4. The input screen is a screen used to set the mode setting information, and the number of images to be displayed and a type of display order can be selected on the screen. In FIG. 4, the number of images to be displayed can be selected as the number of images to be clipped from an omnidirectional image and to be displayed (the number of picked-up images to be displayed). A type of display order can be selected as pick-up priority order. The omnidirectional image in this example is not necessarily an omnidirectional image. For example, an image taken in angles, for example, of 100 to 170 degrees by the camera 20 can be used. In FIG. 4, the pick-up priority order is selected from the order of speeches or the order of levels of volume. The order of speeches is order in which the users start speaking, and the order of levels of volume is descending order of volume of voices of the users. In this example, the number of picked-up images to be displayed and the pick-up priority order can be selected from a pull-down menu. The number of images to be displayed and a type of display order can be selected not only from a pull-down menu but also from, for example, radio buttons, check boxes, or a comb box.

The omnidirectional image can be formed into a doughnut shape showing all the directions of the camera 20 with a continuous circular image, or a panoramic shape showing all the directions of the camera 20 with a horizontally-long rectangular image. The areas as many as the number of picked-up images to be displayed can be clipped from the omnidirectional image. For example, when the number of picked-up images to be displayed is set at "three", the number of clipped images to be displayed is limited to three. Alternatively, when the pick-up priority order is set at "the order of speeches", the images clipped in the order in which the users start speaking are arranged and displayed in order from the observer's left.

In more detail with reference to FIG. 5, the image pickup unit of the other communication apparatus takes all the directions to obtain an omnidirectional image, and outputs the omnidirectional image to the distortion correcting process unit via the image pickup I/F unit. The distortion correcting process unit corrects the omnidirectional image in a distortion correcting process, and outputs the image corrected by the distortion correcting process to the control unit. The control unit gives the transmitter an instruction to transmit the image to the communication apparatus 10. When the receiver 30 of the communication apparatus 10 receives the image, the control unit 34 gives the display control unit 35 an instruction to display the image on the display unit 31. In other words, the image of all the users participating in the conference is displayed on the lower part of the screen illustrated in FIG. 5. In FIG. 5, the omnidirectional image is formed into a doughnut shape. The image can be still images taken at given intervals of time, or video continuously taken. The clipped images described below can also be still images or a video. An example in which the image taken by the camera 20 is an omnidirectional image will be described below. However, the image is not limited to the omnidirectional image, and can be an image in predetermined angles around the camera 20.

After that, when a first user 50 starts speaking, the voice input unit of the other communication apparatus receives the input of the voice of the user 50 and the control unit gives the transmitter an instruction to transmit the voice to the communication apparatus 10. When the receiver 30 of the communication apparatus 10 receives the voice, the communication apparatus 10 causes the control unit 34 to detect the direction of the voice in accordance with the level of the volume of the voice. The control unit 34 can identify the user who speaks by detecting the position of the microphone receiving the input of the largest volume of the voice in the microphone array as the direction in which the user who brings out the voice is. The control unit 34 notifies the area clipping unit 33 of the identified user. The area clipping unit 33 clips the area in the direction in which the identified user is included, and obtains the clipped image. The enlarging/compressing process unit 44 enlarges or compresses the clipped image in a zoom-in process or a zoom-out process as necessary. After that, the control unit 34 gives the display control unit 35 an instruction to display the clipped image together with the omnidirectional image. At that time, the area that does not include a person in the omnidirectional image can be removed with an image process. Alternatively, the omnidirectional image is not displayed at all.

When a second user 51 starts speaking, the clipped image is similarly displayed. When a third user 52 starts speaking, the clipped image is similarly displayed. As described above, the images of the speakers are clipped in order in which the speakers start speaking, and are displayed in the order. In FIG. 5, the clipped images are displayed in order from the left side of the upper part of the screen. Note that the number of images to be displayed is set at "three" in the mode setting information, and thus only three clipped images can be displayed.

When a fourth user 53 starts speaking, the clipped image is similarly obtained. However, the number of images to be displayed is set at "three" in the mode setting information, and thus the fourth clipped image is not displayed. In light of the foregoing, as illustrated in FIG. 6, the clipped image that is first displayed, in other words, the first clipped image is deleted and all the remaining images are slid to the left side. Then, the fourth clipped image is displayed. This allows for displaying the desired number of clipped images to be displayed in desired display order.

The example in which the number of images to be displayed is set at "three" has been described herein. However, when the number of images to be displayed is a different number, as many images as the different number of clipped images to be displayed can similarly be displayed in desired display order.

The operation when the pick-up priority order is not "the order of speeches" but "the order of levels of volume" will be described in detail. The image of the users participating in the conference is displayed similarly to the display when the pick-up priority order is "the order of speeches". The level of volume of each user is determined from the voice input to the voice input unit of the other communication apparatus. Generally, the shorter the distance between the voice and the voice input unit is, the larger the level is while the longer the distance is, the smaller the level is. Generally, the image pickup unit and the voice input unit are integrally included in the other communication apparatus to which the voice is input. Thus, it can be determined in accordance with the level of volume whether the user of which image to be taken is far from or close to the image pickup unit.

The control unit 34 of the communication apparatus 10 extracts the voice for a given period of time from the voice received from the other communication apparatus, and calculates the average voice level of the voice. Then, the control unit 34 temporarily stores the voice in accordance with the average voice level. After the area clipping unit 33 obtains a clipped image, the control unit 34 determines according to the average voice level whether to process the clipped image in a zoom-in process or a zoom-out process. When one of the processes is performed, the control unit 34 notifies the enlarging/compressing process unit 44 of the magnification for enlargement or the diminution rate for compression.

The enlarging/compressing process unit 44 performs the zoom-in process or the zoom-out process in accordance with the magnification or diminution rate notified from the control unit 34. Then, the enlarging/compressing process unit 44 outputs the image data of the processed clipped image to the control unit 34. The control unit 34 gives the display control unit 35 an instruction to arrange and display the processed clipped images from the observer's left side in descending order of average volume level so that the clipped images are displayed in the order on the display unit 31.

When it is determined that three persons speak, the voices of the three persons are obtained and the average volume levels of the three persons' voices are calculated as described above. Then, a zoom-in process or a zoom-out process is performed in accordance with the average volume level. Then, the clipped images are arranged and displayed in descending order of average volume level. As described above, the desired number of clipped images to be displayed can be displayed in desired display order.

The magnification or the diminution rate can be determined with reference to a table in which the magnifications or diminution rates are linked to the volume levels. Note that the magnification or the diminution rate can be not only a value from the table but also a value calculated with a calculation formula or a value read, for example, from a graph.

The process that the communication apparatus 10 performs is summarized in FIG. 7. The process starts from step S700. The communication apparatus 10 displays the input screen for the mode setting of the display unit 31 in step S705. In step S710, the control unit 34 determines whether the number of picked-up images to be displayed is selected. When the number of picked-up images to be displayed is selected, the process goes to step S715. When the number of picked-up images to be displayed is not selected, the process goes to step S725. In step S715, it is determined whether pick-up priority order is selected. When pick-up priority order is selected, the process goes to step S720. When pick-up priority order is not selected, the process goes to step S725. In step S720, the selected number of clipped images to be displayed and the selected priority order are set.

In step S725, the reception unit 32 receives the mode setting information, and determines whether the mode setting is configured by determining whether the received mode setting information is set. When the mode setting is configured, the process goes to step S730 so that the area clipping unit 33 clips one or more areas in accordance with the mode setting information notified from the reception unit 32. When one or more areas are clipped and the clipped images are obtained, the process goes to step S735. The reception unit 32 determines whether the order of levels of volume is set. When the order of levels of volume is set, the process goes to step S740 so that the enlarging/compressing process unit 44 processes the clipped images in a zoom-in process or a zoom-out process based on the preset settings or process results in accordance with the levels of volume.

When the order of levels of volume is not set in step 735, or when the zoom-in process or zoom-out process is completed in step 740, the process goes to step 745. In step 745, the control unit 34 gives the display control unit 35 an instruction to simultaneously display the omnidirectional image and the clipped images on the display unit 31.

When the mode setting is not configured in step S725, the process goes to step 750 so that the control unit 34 gives the display control unit 35 an instruction to only display the omnidirectional image because it is not necessary to display the clipped images. In response to the instruction, the display control unit 35 only displays the omnidirectional image on the display unit 31. Until the conference ends, both the omnidirectional image and the clipped images, or only the omnidirectional image are displayed. When the conference ends, the process is terminated in step S755.

When the fourth user in the example starts speaking, the process goes back to step S730 to clip the area, delete the clipped image of the first user so that the clipped image of the fourth user can be displayed together with the omnidirectional image.

As described above, the preset number of clipped images to be displayed is displayed in preset display order. This enables the user to display an optimal image to the user without the user's operation for processing the omnidirectional image.

The present invention has been described above with the embodiment described as the communication apparatuses and conference system. However, the present invention is not limited to the embodiment, and can be changed within the range that a person having ordinary skill in the art can predict, for example, by another embodiment, or by addition, change, or deletion of a unit. Furthermore, any embodiment is included in the present invention as long as the embodiment brings about the functions or effects of the present invention.

Thus, the present invention can provide a display control method that the communication apparatus performs, a non-transitory computer-readable recording medium that contains a computer program for causing a computer to perform the display control, or an information processing method performed in the conference system. Furthermore, the present invention can also provide a recording medium in which the program is recorded.

According to exemplary embodiments of the present invention, the user can display an optimal image to the user without the user's operation.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication apparatus comprising:
   a receiver configured to receive an image through a network so that the communication apparatus displays at least a part of the received image received from the receiver on a display unit;
   a reception unit configured to receive a number of images to be displayed as clipped images on the display unit and a type of display order in which the clipped images are displayed;
   an area clipping unit configured to provide the clipped image including a speaker from the received image; and
   a control unit configured to give the display unit an instruction to display as many clipped images provided from the area clipping unit as the number of images to be displayed in the type of display order received by the reception unit.

2. The communication apparatus according to claim 1, wherein
   the image includes a plurality of users, and the display order is order in which the users start speaking,
   the receiver receives voices together with the image, and the control unit identifies the user who starts speaking in accordance with the voice received by the receiver and gives the area clipping unit an instruction to clip an area including the identified user, and gives the display unit an instruction to arrange the clipped images in the order in which the users start speaking and display the clipped images together with the image.

3. The communication apparatus according to claim 1, wherein the image includes a plurality of users and the display order is descending order of volume of the users' voices, the receiver receives the voices together with the image, and the control unit identifies the user who speaks in accordance with the voices received by the receiver and gives the area clipping unit an instruction to clip an area including the identified user, and gives the display unit an instruction to arrange the clipped images in the descending order of volume and display the clipped images together with the image.

4. The communication apparatus according to claim 3, further comprising:

an enlarging/compressing process unit configured to perform a process for enlarging or compressing an image of a user in the clipped image in accordance with the volume of each of the users.

5. The communication apparatus according to claim 1, wherein the reception unit displays, on the display unit, an input screen used to input the number of images to be displayed and the display order.

6. A conference system comprising:

a plurality of communication apparatuses according to claim 1, each of the communication apparatuses including an image pickup unit and a transmitter that transmits an image taken by the image pickup unit through a network.

7. The conference system according to claim 6, further comprising:

a transfer device configured to transfer an image received from one of the communication apparatuses to all the communication apparatuses other than the one of the communication apparatuses.

8. A non-transitory computer-readable recording medium that contains a computer program for causing a computer to execute a process for controlling display of a received image received through a network, the process comprising:

receiving a number of images to be displayed as clipped images on a display unit and a type of display order in which the clipped images are displayed;

providing the clipped image including a speaker from the received image; and giving the display unit an instruction to display as many provided clipped images as the number of images to be displayed in the received type of display order.

9. A display control method for controlling display of a received image received through a network, the method comprising:

receiving a number of images to be displayed as clipped images on a display unit and a type of display order in which the clipped images are displayed;

providing the clipped image including a speaker from the received image; and giving the display unit an instruction to display as many provided clipped images as the number of images to be displayed in the received type of display order.

* * * * *